United States Patent [19]

Adams

[11] Patent Number: 5,300,144
[45] Date of Patent: Apr. 5, 1994

[54] BINDER COMPOSITION
[75] Inventor: Thomas E. Adams, Baltimore, Md.
[73] Assignee: Martin Marietta Magnesia Specialties, Inc., Hunt Valley, Md.
[21] Appl. No.: 970,207
[22] Filed: Nov. 2, 1992
[51] Int. Cl.⁵ .............................. C08L 5/00
[52] U.S. Cl. .................. 106/162; 106/139; 106/217
[58] Field of Search ........ 106/162, 217, 139; 536/1.1; 563/1.1

[56] References Cited
U.S. PATENT DOCUMENTS

| | | | |
|---|---|---|---|
| 1,767,170 | 6/1930 | Coleman | 106/217 |
| 1,774,013 | 8/1930 | Howe | 106/217 |
| 1,906,574 | 5/1933 | Gleichert | 106/217 |
| 3,285,756 | 11/1966 | Morén | 106/217 |

Primary Examiner—Helene Klemanski
Attorney, Agent, or Firm—Gay Chin; Bruce M. Winchell; Charles W. Calkins

[57] ABSTRACT

A binder composition for aggregate mixtures which comprises a sugar selected from the group consisting of mono saccharides, di saccharides, tri saccharides and mixtures thereof. Also disclosed are a novel monolithic layer composition incorporating the binder and a method of forming a protective layer in a metallurgical vessel utilizing the monolithic layer composition.

11 Claims, 1 Drawing Sheet

BINDER COMPOSITION

FIELD OF THE INVENTION

The present invention relates to a substantially dry binder system for use with refractory products. The binder system of the present invention may be advantageously utilized to form a monolithic layer from dry or essentially dry refractory products.

BACKGROUND OF THE INVENTION

Metal casting processes such as steelmaking, generally utilize metallurgical vessels to transfer and hold molten metal. For example, in steelmaking processes, molten steel is transferred by means of a ladle from the steelmaking vessel to a metallurgical vessel referred to as a tundish. The molten steel is then constantly fed from the tundish into casting molds.

Tundishes are generally made from steel, or a similar metal, and have a working lining that is able to withstand the high temperatures of the molten steel. In order to minimize the tendency of the molten steel to cool and solidify, especially during pouring, the tundish is usually heated to 500°-1250° C. before use. Continuous feeding is accomplished by maintaining a reservoir of molten steel in the tundish. Upon completion of a pouring, any slag or solidified steel remaining in the tundish is scraped from the lining.

In order to protect, and prolong the life of the tundish, and the tundish lining, conventional practice is to cover the lining with a protective layer. It is desirable for the protective layer to adhere well to the working lining and to be substantially impermeable to molten steel and slag. The protective layer should also be disintegratable. The property of disintegrability refers to the tendency of the protective layer to separate immediately behind any slag or solidified steel retained in the tundish at the completion of a pouring to permit the ready removal of the slag or solidified steel without damage to the lining.

The protective layers typical of the prior art include those formed from trowelling materials, "gunning materials" and boards. Trowelling materials used for the protective layer are generally of magnesia, alumina or alumina-silica based refractory aggregate. The material is simply slurried in water and trowelled onto the surface of the tundish lining. Such an operation, however, requires considerable time, skill and labor. Alternatively, a dry product, such as magnesia, alumina, or the like, may be mixed with water and pumped or sprayed ("gunned") onto the tundish.

The protective layer that results from trowelling or gunning contains a considerable amount of water. A tundish having such a protective layer must generally be preheated for from two to five hours to raise its temperature to 500° to 1250° to attempt to drive all the moisture out of the protective layer. This preheating step disadvantageously consumes time, labor and resources.

Tundish boards, also referred to as insulation panels or lagging sheets, are often utilized as tundish linings. The board is generally prepared from a slurry of refractory aggregate, fibrous material and thermosetting resin in water or other liquid. The slurry is drained of excess liquid and formed into a sheet, and the sheet is then oven dried to cure the resin. The boards are generally installed over the refractory lining of a tundish, with the seams between adjacent sheets filled with mortar and covered with a strip of lagging material. The installation of the board is difficult and time consuming. Additionally, the board is easily eroded by the molten steel and slag, and the steelmaking process, particularly at the seams.

In order to overcome the disadvantages of trowelling materials and boards, a monolithic refractory layer may be utilized as protective layer for metallurgical vessels. Canadian Patent No. 1,198,571, issued Dec. 31, 1985 to the Quigley Company, Inc. ("Canadian Patent '571") describes the use of a monolithic refractory layer as a protective layer for a tundish. According to the disclosed method, a monolithic refractory layer is applied within a metallurgical vessel by positioning a mold in the vessel and filling the space between the outer surface of the mold and the inner surface of the vessel with a dry particulate mixture that upon heating, and subsequent cooling, forms the monolithic refractory layer. The mold utilized has an outer surface substantially conforming to the configuration of the inner surface of the vessel so that a substantially uniform space is formed between the outer mold surface and the inner surface of the vessel to form a protective layer of a substantially uniform thickness in the vessel.

The dry particulate mixture disclosed in Canadian Patent '571 consists of at least about 70%, by weight, refractory aggregate, from about 0.5 to 20%, by weight, thermosetting resin and from 0.5 to 10%, by weight, inorganic binder. The preferred dry particulate mixture consists of from about 70 to 99%, by weight, the refractory aggregate having a maximum particulate size of about 5 millimeters, from about 0.5 to 20%, by weight, of the resin and from about 0.5 to 10%, by weight, inorganic binder and from about 0.5 to 10%, by weight inorganic hydrate. The dry particulate mixture is advantageously forced into place between the outer mold surface and the inner surface of the metallurgical vessel using high pressure gas.

The preferred refractory for use in the dry particulate mixture disclosed in Canadian '571 is deadburned magnesia. The preferred resin is a phenol-formaldehyde resin and is cured at 150°-180° C. Sodium silicate, with, or without, magnesium sulfate heptahydrate is disclosed as a suitable inorganic binder.

The monolithic layer disclosed in Canadian Patent '571 has at least the following disadvantages. First, the inorganic binder requires a relatively high temperature in order to bind the other materials in the dry particulate mixture, and may not completely burn out during formation of the protective layer. Burn out refers to the ability of the binder to completely decompose during heating in order to leave the resulting monolithic protective layer substantially free of the binder. Because an inorganic binder may not completely burn out, its residues may react with the refractory lining of the metallurgical vessel and/or act as a flux, both of which are disadvantageous.

Additionally, phenol formaldehyde resins are classified as hazardous and toxic by OSHA, in the U.S., and similar agencies in other countries. The heating of a particulate mixture including a phenol formaldehyde resin may release hazardous, and or carcinogenic gases. Therefore, protective clothing and special handling procedures are necessary to use this type of resin in a protective layer. Thus the use of phenol formaldehyde resins is a major disadvantage of the protective layer described in Canadian '571.

The present invention overcomes the aforementioned disadvantages of previously utilized protective layers, and binder compositions for refractory layers.

SUMMARY OF THE INVENTION

The present invention includes a substantially dry binder system especially advantageous for use as a binder for refractory products to form a monolithic layer. The present invention also includes a monolithic layer composition incorporating the binder composition of the present invention and a method for forming the monolithic layer.

The binder composition of the present invention comprises a mono, di, or tri saccharide in a substantially dry form. In order to form a monolithic layer, the binder composition of the present invention is present in an amount sufficient to cause the particles of refractory aggregate in the monolithic layer to bind upon the application of heat. Preferably, the binder composition of the present invention will be capable of providing a bond after heating to a temperature of not greater than 260° C. More preferably, the binder composition of the present invention will be capable of providing a bond after heating to a temperature of not greater than 122° C.

The monolithic layer composition of the present invention comprises at least 1%, by weight, the binder composition of the present invention in a substantially dry form, and up to 99%, by weight, substantially dry aggregate. Thus the monolithic layer of the present invention comprises at least 1%, by weight, a mono, di, or tri saccharide in substantially dry form and up to 99%, by weight, aggregate. Preferably, the monolithic layer comprises between 2 and 10%, by weight, the mono-, di- or tri- saccharide, most preferably 4%, by weight, the mono-, di- or tri- saccharide.

The binder composition of the present invention is especially well suited for binding refractory aggregates to form a monolithic refractory layer. Therefore, the dry aggregate used in the monolithic layer composition of the present invention preferably comprises dry refractory aggregate.

The binder composition of the present invention is substantially dry and free flowing. The monolithic layer of the present invention is also substantially dry and free flowing. The monolithic layer of the present invention may include additional aqueous and/or non-aqueous binders, such as intermediate temperature binders, and other materials typically incorporated into monolithic protective layers. However, the concentration of any aqueous component of the monolithic layer must not be so great as to cause the monolithic layer to cease being free flowing. It is preferred that the monolithic layer composition of the present invention be substantially free of phenolic resins and other potentially toxic materials.

Additionally, it is preferable if the binder composition be non-fluxing with respect to the other components making up the monolithic layer. The phrase non-fluxing as used herein means not reactive with other components so as to lower their refractoriness, i.e. their ability to resist change or deformation at high temperatures. It is also preferable for the binder composition to be substantially non-reactive with the other components of the monolithic layer and for the binder composition to yield a relatively little or no carbon upon oxidizing.

The monolithic layer of the present invention may be formed by the method of the present invention. According to the method of the present invention the binder and aggregate are mixed in dry form to produce a dry, vibratable mixture. In order to form a monolithic protective layer on the bottom and sides of a metallurgical vessel, the dry mixture may first be spread evenly over the bottom of the vessel to a desired uniform thickness. Next a mold having an outer surface conforming to the configuration of the inner surface of the metallurgical vessel is placed in the vessel on top of the dry mixture on the bottom of the vessel so as to form a uniform space between the outer surfaces of the mold and the inner surfaces of the vessel. The dry binder/aggregate mixture of the present invention is poured into the uniform space and may be evenly distributed by vibrating the vessel. The mold is then heated to a temperature sufficient to bind the aggregate together and form a monolithic layer. Generally, the mold need only be heated to a temperature that will cause the binder composition to melt. Preferably, the binder composition will cause the aggregate to bind and form a monolithic layer at a temperature not greater than 260° C. More preferably, the binder composition will cause the aggregate to bind and form a monolithic layer at a temperature of not greater than 122° C. The mold is then cooled and removed from the metallurgical vessel. The result is a metallurgical vessel having a protective layer on its inner surface, formed from the monolithic layer composition of the present invention.

An advantage of the binder composition of the present invention is that it is substantially dry. Thus, during use, the binder composition of the present invention does not require a drying step for the removal of water. Additionally, the binder composition of the present invention is easily mixed, in substantially dry form, with aggregate material to form a dry, vibratable mixture. Further, a dry binder composition is simpler to transport and store.

Another advantage of the binder composition of the present invention is that it will bind aggregate upon the application of relatively low amounts of heat.

A further advantage of the binder composition of the present invention is that it is not classified as hazardous, toxic or carcinogenic material and therefore does not require special precautions prior to use.

The monolithic layer composition is well suited for use as a protective layer in a tundish, and especially well suited for use as a protective layer over the tundish lining.

An advantage of the monolithic layer composition of the present invention is that it is dry prior to use. Therefore the composition may be easily transported and stored in manners known to the art for transporting dry bulk materials.

Another advantage of the monolithic layer composition is that it may be vibrated to densify the composition for storage, transport and/or use.

A further advantage of the monolithic layer composition is that it is made with the binder composition of the present invention and therefore retains the advantages of the binder composition of the present invention.

The advantages of the method of the present invention, for forming the monolithic layer, include its use of the binder composition of the present invention.

Further advantages of the binder composition, monolithic layer composition and method of the present invention will become apparent from the following more detailed description of the invention.

DETAILED DESCRIPTION OF THE INVENTION

Figure 1:
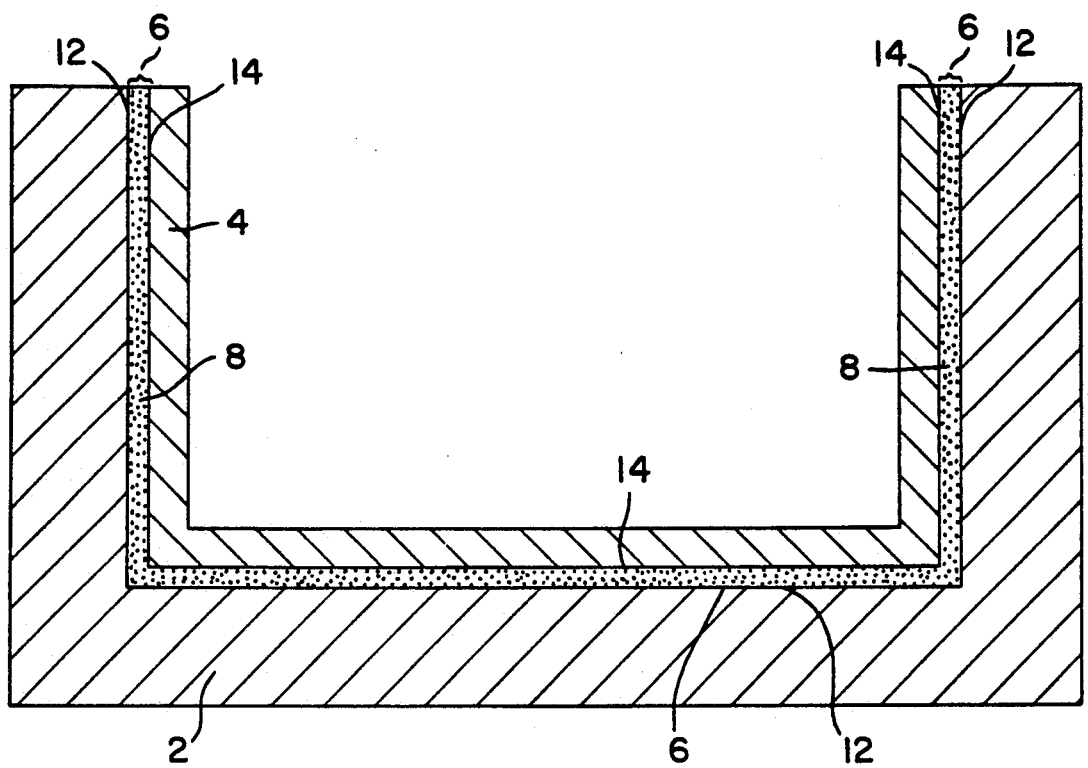
FIG. 1 depicts a representation of the monolithic layer composition of the present invention in a metallurgical vessel prior to the formation of the monolithic layer.

The present invention includes a binder composition especially useful as a binder composition for refractory aggregates; a monolithic layer composition incorporating the binder composition of the present invention; and a method for forming a monolithic protective layer on the inner surface of a metallurgical vessel.

The binder composition of the present invention comprises: a mono-, di- or tri- saccharide. The monolithic layer composition of the present invention comprises: at least 1%, by weight, a mono-, di- or tri- saccharide, and up to 99%, by weight, aggregate. Preferably the monolithic layer composition of the present invention comprises between 2 and 10%, by weight, the mono-, di- or tri- saccharide and more preferably 4%, by weight, the mono-, di- or tri- saccharide. It is also preferred for the binder composition of the present invention to substantially free of inorganic materials.

The binder composition of the present invention is present, in the monolithic layer composition, in an amount that will cause the components of the monolithic layer composition to from a bond upon the application of heat, preferably after heating to a temperature of not greater than 260° C. More preferably, the binder composition of the present invention will be capable of providing a bond after heating to a temperature of not greater than 122° C.

Suitable mono, di, or tri saccharide include the many varieties of sugar known in the art. Thus, suitable mono- , di- or tri- saccharides include, but are not limited to, fructose, dextrose (glucose), sucrose, dextrose monohydrate, lactose, maltose, cellobiose and combinations thereof. The mono-, di- or tri- saccharide may be introduced in substantially pure form, or may be introduced as a component of another product such as a carbohydrate containing substance. Suitable mono-, di- or tri- saccharides in substantially pure form include, cane sugar, corn syrup, table sugar, beet sugar, maple sugar, dried honey and others. Examples of products incorporating a mono-, di- or tri- saccharide that may be utilized in the present invention include, but are not limited to, corn syrup solids, milk solids, bagasse and "starches" that contain sugar. If the mono-, di- or tri- saccharide is introduced as a component of another product, the product should be present in an amount in the monolithic layer such that the mono-, di- or tri- saccharide percentage in the monolithic layer is at least 1%, by weight.

Suitable refractory aggregates for use in the monolithic layer of the present invention include the refractory aggregate well known to those of ordinary skill in the art. These aggregates include, but are not limited to magnesia, deadburned magnesia, dolomite, deadburned dolomite, alumina, silica, zircon, alumina-silica based refractories, bauxite. graphite and combinations thereof. The choice of particular aggregate depends on the intended use of the metallurgical vessel being lined and is within the skill of one or ordinary skill in the art. Magnesia, and deadburned magnesia are the preferred aggregates.

Preferably, the particle size of the mono, di and tri saccharide utilized in the monolithic layer of the present invention is under 2 inches in diameter, more preferably under 10 mesh. Similarly, the preferred particle size of the aggregate is under 2 inches in diameter, more preferably under 10 mesh.

The monolithic layer composition may incorporate aqueous and/or non-aqueous binders, and other materials, such as resins, typically incorporated into monolithic protective layers. However, the concentration of any aqueous component of the monolithic layer must not be so great as to cause the monolithic layer to cease being free flowing. As set forth above, it is preferred that the monolithic layer composition of the present invention be free of phenolic resins and other potentially toxic materials.

As also set forth above, it is preferable if the binder composition be non-fluxing with respect to the other components making up the monolithic layer. It is also preferable for the binder composition to be substantially non-reactive with the other components of the monolithic layer and for the binder composition to yield a relatively little or no carbon upon oxidizing.

The method of the present invention for making a monolithic layer from the binder composition of the present invention will be further explained with reference to the Figures. FIG. 1 depicts a representation of a metallurgical vessel, 2, containing a mold 4. The space 6, between the outer surface 14 of the mold 4, and the inner surface 12, of the vessel 2, is filled with the monolithic layer composition of the present invention 8.

The metallurgical vessel 2, may comprise a steel shell having a working lining of refractory brick, or a castable, as inner surface 12. Typical metallurgical vessels include tundishes and ladles. Mold 4 is generally formed from a mild steel plate or another metal that can be readily heated and provide good heat transfer to the monolithic layer composition. Mold 4, may be equipped with air vents and a heating element in order to facilitate heating the monolithic layer composition. However, as indicated below, it is possible to heat the monolithic layer composition by heating the metallurgical vessel. In this case, mold 4 need not be made from a heatable material, and may comprise a less costly material, such as cardboard or the like, that is inflammable at the temperatures utilized to melt the binder composition.

The placement of the monolithic layer composition in space 6 may be accomplished by a variety of means within the skill of those of ordinary skill in the art. For example, a layer of the monolithic layer composition 8, may be spread evenly in the bottom of the metallurgical vessel 2. Then, mold 4 may be placed on top of the monolithic layer composition 8, to form space 6 along the sides of the vessel. The space 6, along the sides of the vessel may be filled with the monolithic layer composition 8, by pouring the composition into the space. The vessel 2, and/or the mold 4, may then be vibrated to cause the monolithic layer composition to evenly distribute and settle along the sides of the vessel.

In order to form a monolithic layer, mold 4, or metallurgical vessel 2, is heated to a temperature sufficient to melt the binder composition component of the monolithic layer composition. Depending on the mono-, di- or tri- saccharide utilized in the binder composition, mold 4, or metallurgical vessel 2, may only need to be heated to a temperature below 122° C.

Figure 2:
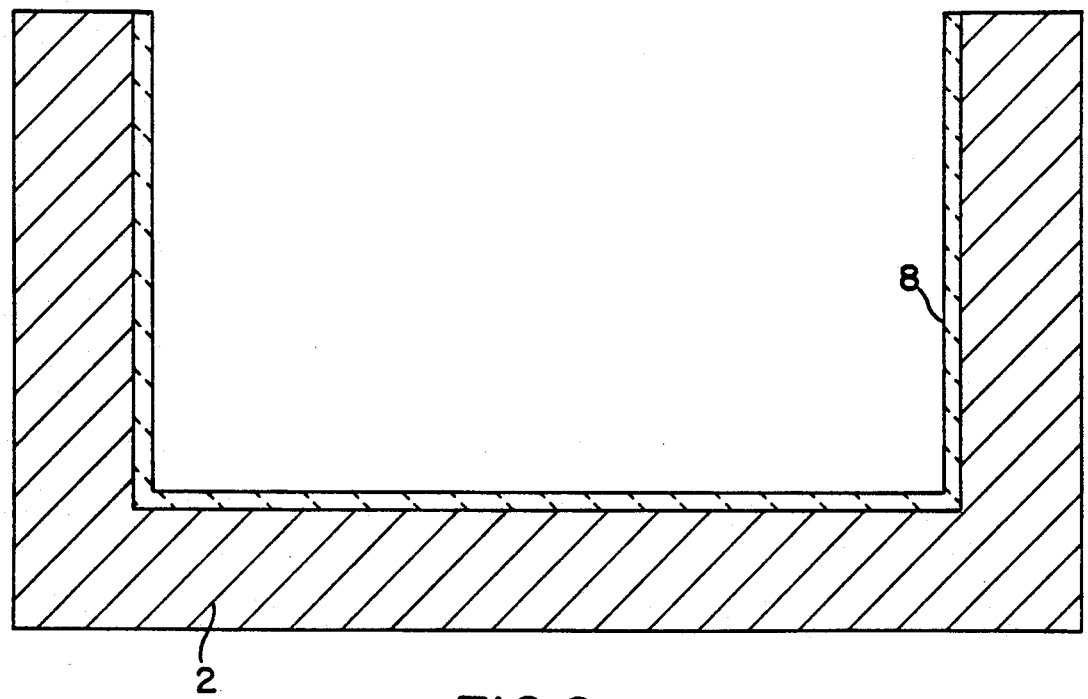
FIG. 2 depicts a representation of the metallurgical vessel in FIG. 1 after the formation of the monolithic protective layer.

Mold 4 is then cooled and removed to leave a monolithic protective layer on the inner surface 12 of the metallurgical vessel. FIG. 2 is a representation of the metallurgical vessel 2, after removal of mold 4, and shows monolithic protective layer 20 along the inner surface 12 of vessel 2.

It should be understood that although one method for using the monolithic layer composition and binder composition of the present invention is described herein, the monolithic layer composition and binder composition of the present invention may be used in a variety of other manners within the skill of those of ordinary skill in the art. Additional details concerning the preparation and use of the binder composition of the present invention and the monolithic layer composition of the present invention, and their features and advantages, will become apparent from the following Examples.

EXAMPLE 1

This example illustrates the formation of a monolithic layer from a monolithic layer composition of the present invention.

A monolithic layer composition of the present invention was prepared by dry blending 95%, by weight, a 98% MgO periclase aggregate of graded particle size distribution (30 to 50%, plus 30 mesh; 25 to 35% minus 30 plus 100 mesh; 25-35% minus 100 mesh) with 5%, by weight powdered fructose. The mixture was dry blended until well mixed and then poured into 2" diameter unwaxed cardboard cylinders and vibrated to condense the mixture to a bulk density of about 135-145 pounds/cubic foot. The filled cylinders were placed in a 177° C. dryer overnight. After removal from the dryer the next day, the cylinders were briefly cooled and then the cardboard stripped from the sample. The result was solid cylinders formed from a composition of the present invention. Upon testing, according to the procedure described in ASTM C133-91, the cylinders had an average cold crush strength value of 240 pounds per square inch.

This illustrates that the binder composition of the present invention may be utilized in a monolithic layer composition of the present invention to form solid ceramics having sufficient cold crush strength to be useful as protective layers in metallurgical vessels.

EXAMPLE 2

This example also illustrates the formation of a monolithic layer from a monolithic layer composition of the present invention.

A monolithic layer composition of the present invention was prepared by dry blending 95%, by weight, a 98% MgO periclase aggregate of graded particle size distribution (30 to 50%, plus 30 mesh; 25 to 35% minus 30 plus 100 mesh; 25-35% minus 100 mesh) with 5%, by weight powdered dextrose. The mixture was dry blended until well mixed and then poured into 2" diameter unwaxed cardboard cylinders and vibrated to condense the mixture to a bulk density of about 135-145 pounds/cubic foot. The filled cylinders were placed in a 177° C. dryer overnight. After removal from the dryer the next day, the cylinders were briefly cooled and then the cardboard stripped from the sample. The result was solid cylinders formed from a composition of the present invention. Upon testing, according to the procedure described in ASTM C133-91, the cylinders had an average cold crush strength value of 240 pounds per square inch.

This example also illustrates that the binder composition of the present invention may be utilized in a monolithic layer composition of the present invention to form solid ceramics having sufficient cold crush strength to be useful as protective layers in metallurgical vessels.

EXAMPLE 3

This example illustrates the formation of a monolithic layer from a monolithic layer composition of the present invention incorporating an intermediate temperature binder.

A monolithic layer composition of the present invention was prepared by dry blending 94%, by weight, a 98% MgO periclase aggregate of graded particle size distribution (30 to 50%, plus 30 mesh; 25 to 35% minus 30 plus 100 mesh; 25-35% minus 100 mesh) with 4%, by weight powdered cane sugar and 2%, by weight, crystalline (approximately minus 30 mesh) sulfamic acid as an intermediate temperature binder. The mixture was dry blended until well mixed and then poured into 2" diameter unwaxed cardboard cylinders and vibrated to condense the mixture to a bulk density of about 135-145 pounds/cubic foot.

In order to evaluate the effect of different temperatures on the composition, the filled cylinders were divided into 5 groups, A-E. The groups were placed in different dryers overnight. Group A was placed in a dryer heated to a temperature of 163° C. Group B was placed in a dryer heated to a temperature of 260° C. Group C was placed in a kiln heated to a temperature of 538° C. Group D was placed in a kiln heated to a temperature of 816° C. Group E was placed in a kiln heated to a temperature of 1093° C.

The next day each group of cylinders, A-E was removed from their respective dryers/kilns. The cylinders were briefly cooled and then the remaining cardboard stripped from each sample. The result was solid cylinders formed from a composition of the present invention. Upon testing, according to the procedure described in ASTM C133-91,the cylinders from each group had an average cold crush strength value set forth in Table 1 below.

TABLE 1

| Cylinder Group | Temperature | Cold Crush Strength |
| --- | --- | --- |
| A | 163° C. | 135 psi |
| B | 260° C. | 274 psi |
| C | 538° C. | 55 psi |
| D | 816° C. | 150 psi |
| E | 1093° C. | 130 psi |

This illustrates that an additional binder may be used in the monolithic layer composition of the present invention in order to provide strength in the intermediate temperature range.

EXAMPLE 4

This example illustrates the use of water in the monolithic layer composition of the present invention to control dust.

A monolithic layer composition of the present invention was prepared by dry blending 24%, by weight, 4 by 8 mesh Chinese bauxite, 24%, by weight, 8 by 20 mesh Chinese bauxite, 24%, by weight, minus 20 mesh Chinese bauxite and 23%, by weight, minus 100 mesh Chinese bauxite with 5%, by weight powdered dextrose.

The mixture was dry blended until well mixed. After dry blending, an amount of water equal to 0.1%, by weight, of the dry mixture was mixed in to control dust. The mixture was then poured into 2" diameter unwaxed cardboard cylinders and vibrated to condense the mixture to a bulk density of about 135-145 pounds/cubic foot. The filled cylinders were placed in a 177° C. dryer overnight. After removal from the dryer the next day, the cylinders were briefly cooled and then the cardboard stripped from the sample. The result was solid cylinders formed from a composition of the present invention. Upon testing, according to the procedure described in ASTM C133-91, the cylinders had an average cold crush strength value of 135 pounds per square inch.

These results illustrate that the use of the binder composition of the present invention, comprising a mono-, di- or tri- saccharide, is not limited to use with basic aggregates, or completely dry mixes.

EXAMPLE 5

This example illustrates that the binder composition of the present invention will exhibit strength development after heating to a temperature as low as 122° C.

A composition was prepared similar to the composition in Example 4, except that only 1.85% powdered fructose was substituted for the 5% powdered dextrose and no water was added. Thus, a monolithic layer composition of the present invention was prepared by dry blending 24%, by weight, 4 by 8 mesh Chinese bauxite, 24%, by weight, 8 by 20 mesh Chinese bauxite, 24%, by weight, minus 20 mesh Chinese bauxite and 26.15%, by weight, minus 100 mesh Chinese bauxite with 1.85%, by weight powdered dextrose. The mixture was dry blended until well mixed and then poured into 2" diameter unwaxed cardboard cylinders and vibrated to condense the mixture to a bulk density of about 135-145 pounds/cubic foot. The filled cylinders were placed in a 122° C. dryer overnight. After removal from the dryer the next day, the cylinders were briefly cooled and then the cardboard stripped from the sample. The result was solid cylinders formed from a composition of the present invention. Upon testing, according to the procedure described in ASTM C133-91, the cylinders had an average cold crush strength value of 91 pounds per square inch.

This example also illustrates that the binder composition of the present invention may be utilized in a monolithic layer composition of the present invention to form solid ceramics having sufficient cold crush strength to be useful as protective layers in metallurgical vessels.

EXAMPLE 6

This example illustrates that without the addition of the binder composition of the present invention, a monolithic layer composition with sufficient strength to be self-supporting cannot be formed after heating to 122° C.

A composition was prepared using the same ingredients as in Example 5 except no binder composition of the present invention was utilized. Thus, the compositions were prepared by dry blending 24%, by weight, 4 by 8 mesh Chinese bauxite, 24%, by weight, 8 by 20 mesh Chinese bauxite, 24%, by weight, minus 20 mesh Chinese bauxite and 28%, by weight, minus 100 mesh Chinese bauxite. The mixture was dry blended until well mixed and then poured into 2" diameter unwaxed cardboard cylinders and vibrated to condense the mixture to a bulk density of about 135-145 pounds/cubic foot. The filled cylinders were placed in a 122° C. dryer overnight. After removal from the dryer the next day, the cylinders were briefly cooled and then the cardboard stripped from the sample. After the stripping away of the cardboard the cylinders had no strength and fell apart.

I claim:

1. A binder composition for aggregate mixtures comprising:
   a substantially dry sugar selected from the group consisting of monosaccharides, disaccharides, trisaccharides and mixtures thereof; in an amount sufficient to bind the aggregate upon heating.

2. A composition comprising:
   at least 1%, by weight, a substantially dry binder selected from the group consisting of mono saccharides, di saccharides, tri saccharides and mixtures thereof, and up to 99%, by weight, aggregate.

3. The composition of claim 2 wherein the binder is present in an amount of between 2 and 10% by weight.

4. The composition of claim 3 wherein the binder is present in an amount of 4%, by weight.

5. The composition of claim 2 wherein the aggregate comprises a refractory material.

6. The composition of the claim 5 wherein the aggregate is selected from the group consisting of magnesia, deadburned magnesia, dolomite, deadburned dolomite, alumina, silica, zircon, alumina-silica based refractories, bauxite, graphite and combinations thereof.

7. The composition of claim 5 wherein the mono-, di- or tri-saccharide is selected from the group consisting of: fructose, sucrose, glucose, dextrose and mixtures thereof.

8. The composition of claim 6 wherein the particle size of the aggregate is smaller than 2 inches in diameter and the particle size of the mono-, di- or tri-saccharide is smaller than 10 mesh.

9. The composition of claim 8 wherein the particle size of the aggregate is smaller than 2 inches in diameter and the particle size of the mono-, di- or tri- saccharide is smaller than 10 mesh.

10. A composition comprising:
    up to 99%, by weight, aggregate, and
    a carbohydrate containing substance including a substantially dry component selected from the group consisting of mono saccharides, di saccharides, tri saccharides and mixtures thereof, wherein the monosaccharide, disaccharide or trisaccharide component is present in the composition in an amount of at least 1%, by weight.

11. The composition of claim 10 wherein the carbohydrate containing substance is selected from the group consisting of corn syrup solids and milk solids.

* * * * *

UNITED STATES PATENT AND TRADEMARK OFFICE
CERTIFICATE OF CORRECTION

PATENT NO. : 5,300,144
DATED : April 5, 1994
INVENTOR(S) : Thomas E. Adams

It is certified that error appears in the above-indentified patent and that said Letters Patent is hereby corrected as shown below:

Column 5, line 29, after "to" insert --be--; line 33, change "from" to --form--; line 66, change the period "(.)" to a comma --,--.

Column 6, line 1, delete "or" and substitute --of--.

Column 10, lines 19 and 20, delete "in an amount sufficient to bind" and substitute --wherein the binder composition is capable of binding--; line 20, after "heating" and before the period (.) insert --to a temperature of not greater than 122°C--; line 40, delete "glucose,".

Signed and Sealed this

Twenty-fourth Day of October, 1995

Attest:

BRUCE LEHMAN

Attesting Officer

Commissioner of Patents and Trademarks